US008816815B2

(12) United States Patent
Kuramochi et al.

(10) Patent No.: US 8,816,815 B2
(45) Date of Patent: Aug. 26, 2014

(54) LOCK DEVICE FOR POWER SUPPLYING PLUG

(75) Inventors: Yuichi Kuramochi, Aichi (JP); Toshiharu Katagiri, Aichi (JP); Keiji Kahara, Aichi (JP); Naoto Kurumizawa, Aichi (JP); Takahiro Hirashita, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 114 days.

(21) Appl. No.: 13/542,919

(22) Filed: Jul. 6, 2012

(65) Prior Publication Data
US 2013/0015951 A1    Jan. 17, 2013

(30) Foreign Application Priority Data

Jul. 12, 2011    (JP) .................................. 2011-154135

(51) Int. Cl.
*G05B 19/00*    (2006.01)
(52) U.S. Cl.
USPC ............. 340/5.64; 340/5.65; 701/22; 701/49; 439/304
(58) Field of Classification Search
CPC ................. G07C 9/00182; G07C 2009/00793; G07C 9/00309; G07C 9/00111; G07C 2009/00761; G07C 9/00103; G07C 9/00944; B60R 25/24; E05B 47/0611; B60W 20/00; B60W 10/08; B60W 10/06; Y02T 10/6286; Y02T 10/7005; Y02T 90/121; Y02T 10/7088; Y02T 90/14; B60K 6/445; B60N 2/0248; B60N 2/0244; B60N 2/0232; B60N 2/0252; B60Q 2300/112; H01R 13/6397; H01R 13/6275; H01R 2103/00; H01R 13/60; B60L 11/1818

USPC .............. 340/5.64, 5.65; 701/22, 49; 439/304
See application file for complete search history.

(56) References Cited

U.S. PATENT DOCUMENTS

| 5,202,617 | A | 4/1993 | Nor |
| 5,934,918 | A | 8/1999 | Wuechner |
| 8,150,573 | B2 | 4/2012 | Shimizu et al. |
| 8,262,402 | B2 | 9/2012 | Gaul et al. |

(Continued)

FOREIGN PATENT DOCUMENTS

| CN | 1846038 | 10/2006 |
| CN | 1978852 | 6/2007 |

(Continued)

OTHER PUBLICATIONS

China Office action, mail date is May 6, 2014.

*Primary Examiner* — Omer S Khan
(74) *Attorney, Agent, or Firm* — Greenblum & Bernstein P.L.C.

(57) ABSTRACT

A lock device for a power supplying plug arranged in a vehicle that performs wireless communication with an electronic key. The lock device includes a charge ECU that restricts unauthorized removal of the power supplying plug from an inlet of the vehicle. The vehicle includes antennas that transmit a wireless signal. A first one of the antennas relates to permission for removal of the power supplying plug. A second one of the antennas relates to unlocking or permission for unlocking of a door. A charge ECU stops transmitting the wireless signal from the first antenna when the vehicle is parked and the second antenna transmits the wireless signal. The charge ECU stops the transmission of the wireless signal related to the unlocking of the door when the wireless signal related to removal of the power supplying plug is transmitted.

3 Claims, 3 Drawing Sheets

(56) References Cited

U.S. PATENT DOCUMENTS

| | | | |
|---|---|---|---|
| 8,344,686 B2 | 1/2013 | Gaul et al. | |
| 8,723,477 B2 | 5/2014 | Gaul et al. | |
| 2007/0018789 A1 | 1/2007 | Yuhara | |
| 2009/0043450 A1* | 2/2009 | Tonegawa et al. | 701/36 |
| 2009/0242291 A1* | 10/2009 | Sagawa et al. | 180/65.265 |
| 2010/0211272 A1* | 8/2010 | Ichihara | 701/49 |
| 2010/0235026 A1 | 9/2010 | Shimizu et al. | |
| 2011/0022256 A1* | 1/2011 | Asada et al. | 701/22 |
| 2011/0281447 A1* | 11/2011 | Kano et al. | 439/133 |
| 2011/0300733 A1* | 12/2011 | Janarthanam et al. | 439/304 |
| 2012/0013301 A1 | 1/2012 | Gaul et al. | |
| 2012/0071017 A1 | 3/2012 | Gaul et al. | |
| 2012/0119702 A1 | 5/2012 | Gaul et al. | |
| 2012/0133326 A1 | 5/2012 | Ichikawa et al. | |
| 2012/0135634 A1 | 5/2012 | Gaul et al. | |
| 2012/0313580 A1* | 12/2012 | Charnesky et al. | 320/109 |

FOREIGN PATENT DOCUMENTS

| | | |
|---|---|---|
| CN | 101506020 | 8/2009 |
| DE | 102007002025 | 7/2008 |
| JP | 09-161898 | 6/1997 |
| JP | 2005-194799 | 7/2005 |
| TW | 201036229 | 10/2010 |
| TW | 201044712 | 12/2010 |
| TW | 201110478 | 3/2011 |
| TW | 201112536 | 4/2011 |
| WO | 2010/137144 | 12/2010 |

* cited by examiner

LOCK DEVICE FOR POWER SUPPLYING PLUG

CROSS-REFERENCE TO RELATED APPLICATIONS

This application is based upon and claims the benefit of priority from prior Japanese Patent Application No. 2011-154135, filed on Jul. 12, 2011, the entire contents of which are incorporated herein by reference.

BACKGROUND OF THE INVENTION

The present invention relates to a lock device for a power supplying plug connected to a power receiving connector to charge a battery.

Automobile manufacturers are developing electric vehicles (including hybrid vehicles) that use motors as drive sources to lower exhaust gas emissions. In such an electric vehicle, a battery drives the drive source. When the state of charge of the battery becomes low, the battery must be charged using a power supply provided in a household or a charging station. Thus, an electric vehicle includes a charging system that can easily be used by a user. Japanese Laid-Open Patent Publication No. 9-161898 describes such a system. In this system, an inlet (power receiving connector) is arranged in a vehicle. A power supplying plug connected to, for example, a commercial household power supply can be connected to the inlet. A user parks the vehicle at his or her home and connects the power supplying plug to the inlet. This supplies power to the vehicle and charges the battery. The power supplying plug includes a hook and an operation portion. The inlet includes a catch. Engagement of the hook with the catch keeps the power supplying plug connected to the inlet. Operation of the operation portion moves the hook and disengages the hook from the catch. This permits removal of the power supplying plug from the inlet.

The charging of a battery requires a longer time compared to filling a gasoline vehicle with gasoline. Thus, the user will leave the vehicle with the power supplying plug connected to the inlet for a long period. As a result, for example, someone may remove the power supplying plug from the vehicle that is being supplied with power in an unauthorized manner to connect the power supplying plug to another vehicle and steal electricity. The power supplying plug may also be stolen. Accordingly, a lock device for a power supplying plug has been developed to restrict movement of the hook when the battery is being charged. One example of such a lock device includes a motor-driven lock bar. When the hook of the power supplying plug is engaged with the hook, the lock bar fixes the hook at a lock position and prohibits movement of the hook. When the lock bar is in such a lock state, the power supplying plug cannot be removed from the inlet. To remove the power supplying plug from the inlet, the lock bar is moved to an unlock position to permit movement of the hook of the power supplying plug. The lock device includes an unlock switch and a sensor, which detects connection of the inlet and the power supplying plug. When the sensor detects connection, the lock bar is moved from the unlock position to the lock position. When the unlock switch is operated, the lock bar is moved from the lock position to the unlock position.

Japanese Laid-Open Patent Publication No. 2005-194799 describes an example of a smart system installed in a vehicle that performs wireless communication with an electronic key, which is carried by a user, to permit the locking and unlocking of vehicle doors and the starting of the engine only when wireless communication is established. The vehicle intermittently transmits a wireless signal in the LF band to form a transmission area near the vehicle. When the electronic key enters the communication area and receives the LF band wireless signal, the electronic key transmits a wireless signal in the UHF band to the vehicle. When the vehicle determines that the received UHF band wireless signal is correct, the vehicle permits the unlocking of the doors.

To improve security, lock devices for power supplying plugs using a smart system have been developed. Such a lock device includes an antenna that transmits a wireless signal in the LF band in the proximity of the inlet. When the wireless signal from the antenna triggers and establishes communication between the vehicle and the electronic key, the lock device permits removal of the power supplying plug. This further prevents unauthorized removal of the power supplying plug.

However, the wireless signal forming the communication area may be superimposed on the wireless signal from the antenna of the inlet. Superimposed LF band wireless signals interfere with and cancel each other. When such interference occurs, even when the electronic key enters an area in which the LF band wireless signal can be received, the electronic key may not be able to receive the wireless signal. When the electronic key cannot receive the wireless signal, wireless communication is not established between the electronic key and the vehicle. In such a case, the lock device for the power supplying plug does not permit removal of the power supplying plug.

SUMMARY OF THE INVENTION

One aspect of the present invention is a lock device for a power supplying plug fitted to and removed from an inlet arranged in a vehicle. The vehicle includes a verification function, which transmits or receives a wireless signal to or from an electronic key and unlocks or permits unlocking of a door, and a plurality of antennas used to transmit a wireless signal requesting the electronic key for a response. The lock device includes a control unit that restricts unauthorized removal of the power supplying plug from the inlet or permits removal of the power supplying plug from the inlet using the verification function. The controller transmits a wireless signal that requests the electronic key for a response related to the permission of removal of the power supplying plug from a first one of the antennas, transmits a wireless signal that requests the electronic key for a response related to the unlocking or permission of unlocking of the door from a second one of the antennas, normally stops transmitting the wireless signal related to the removal of the power supplying plug from the first one of the antennas when the wireless signal related to the unlocking of the door is transmitted from the second one of the antennas in a state in which the vehicle is parked, and stops transmitting the wireless signal related to the unlocking or permission of unlocking of the door when the wireless signal related to the removal of the power supplying plug is transmitted.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

A lock device for a power supplying plug according to one embodiment of the present invention will now be described with reference to the drawings. The lock device is applied to a plug-in hybrid vehicle.

Electronic Key System

Figure 1:
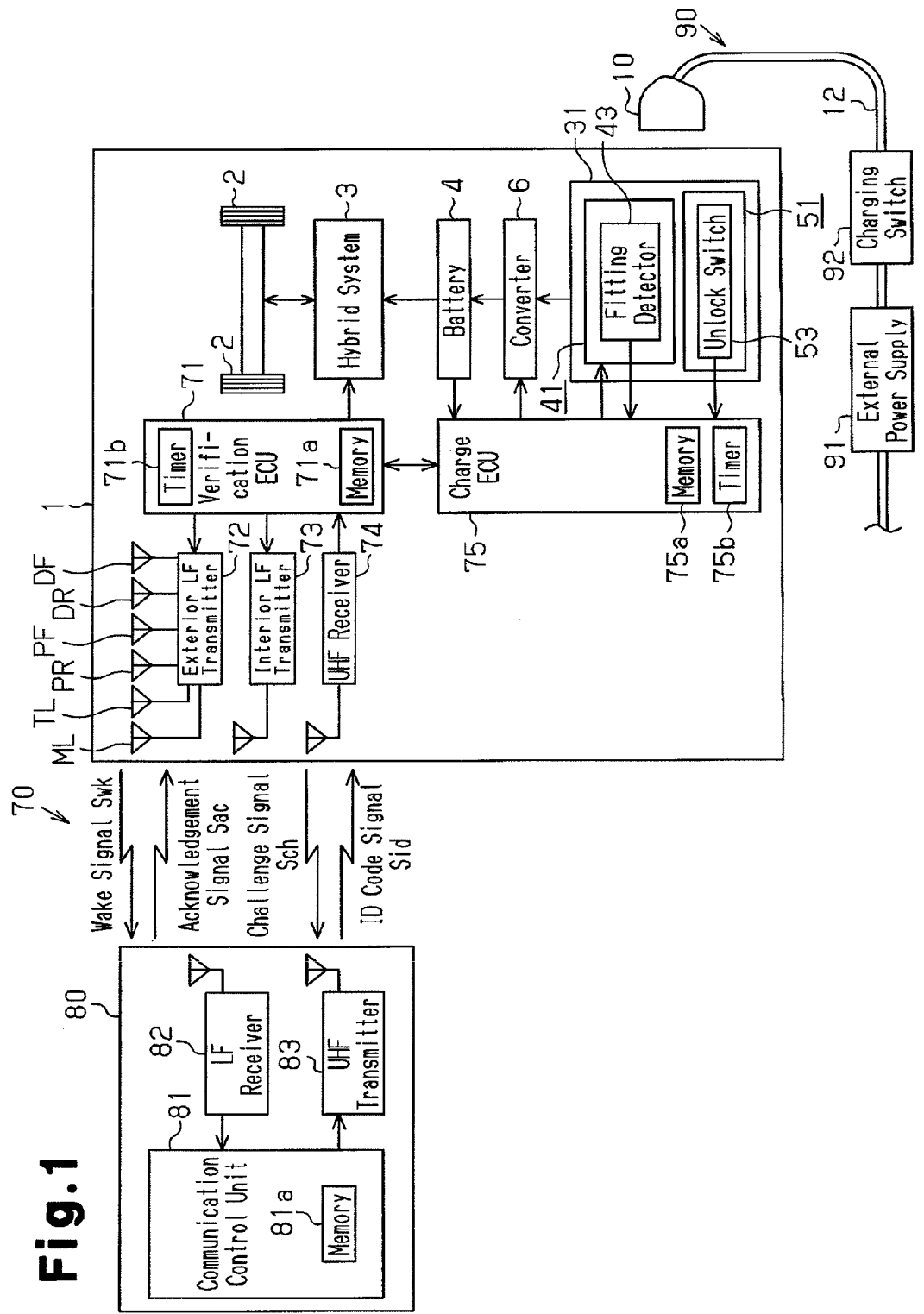
FIG. 1 is a schematic block diagram of a lock device for a power supplying plug according to one embodiment of the present invention.

Referring to FIG. 1, a vehicle 1 includes an electronic key system 70 that permits, for example, the locking and unlocking of the vehicle doors without the need for the driver to actually use a vehicle key. The electronic key system 70 includes an electronic key 80 that performs communication with the vehicle 1.

The vehicle 1 includes an electronic control unit (ECU) 71 that verifies ID codes of the electronic key 80 and the vehicle 1. Further, the vehicle 1 includes an exterior low frequency (LF) transmitter 72, an interior LF transmitter 73, and an ultra high frequency (UHF) receiver 74. The verification ECU 71 includes a memory 71a, which stores an ID code that is a key code unique to the vehicle 1. The exterior LF transmitter 72, the interior LF transmitter 73, and the UHF receiver 74 are connected to the verification ECU 71. The exterior LF transmitter 72, the interior LF transmitter 73, and the UHF receiver 74 include antennas. The antennas of the exterior LF transmitter 72 are arranged in each door of the vehicle 1 and an inlet 31, which will be described later. Each antenna of the exterior LF transmitter 72 transmits a wireless signal in the LF band to the vehicle exterior. The antenna of the interior LF transmitter 73 is arranged in a vehicle floor or the like. The antenna of the interior LF transmitter 73 transmits a wireless signal in the LF band to the vehicle interior. The antenna of the UHF receiver 74 is arranged in the vehicle interior. The antenna of the UHF receiver 74 receives a wireless signal in the UHF band. These antennas can be switched. An LF band wireless signal transmitted from the vehicle 1 includes a wake signal Swk and a challenge signal Sch. The wake signal Swk is used by the electronic key 80 to determine that the vehicle 1 is located nearby. The challenge signal Sch is used to request the electronic key 80 to transmit an ID code. Further, the vehicle 1 includes a door lock device, which unlocks the vehicle doors, and a touch sensor (not shown) arranged on a door handle to detect the user touching the door handle.

The electronic key 80 includes a communication control unit 81, an LF receiver 82, and an UHF transmitter 83. The communication control unit 81 includes a memory 81a, which stores an ID code unique to the electronic key 80. The LF receiver 82 and the UHF transmitter 83 are connected to the communication control unit 81. The LF receiver 82 receives a wireless signal in the LF band. The UHF transmitter 83 transmits a wireless signal in the UHF band when instructed to do so by the communication control unit 81. The ULF band wireless signal transmitted from the electronic key 80 includes an acknowledgement signal Sac and an ID code signal Sid. The acknowledgement signal Sac is transmitted in response to the wake signal Swk. The ID code signal Sid is transmitted in response to the challenge signal Sch and includes an ID code.

The verification ECU 71 intermittently transmits the LF band wake signal Swk from the exterior LF transmitter 72 and forms an exterior communication area near the vehicle 1. Here, the verification ECU 71 activates only the door antennas and deactivates the antenna of the inlet 31. When the electronic key 80 enters the exterior communication area, the communication control unit 81 receives the wake signal Swk via the LF receiver 82. When the communication control unit 81 receives the wake signal Swk via the LF receiver 82, the communication control unit 81 transmits the UHF band acknowledgement signal Sac from the UHF transmitter 83.

The verification ECU 71 receives the acknowledgement signal Sac via the UHF receiver 74 and transmits the LH band challenge signal Sch from the exterior LF transmitter 72. The communication control unit 81 of the electronic key 80 receives the challenge signal Sch via the LF receiver 82 and transmits the UHF band ID code signal Sid, which is registered in its memory 81a, from the UHF transmitter 83. The verification ECU 71 receives the ID code signal Sid via the UHF receiver 74. The verification ECU 71 performs ID verification (exterior verification) with the ID code registered in its memory 71a and the ID code in the ID code signal Sid. When the exterior verification is accomplished and the ECU 71 determines with the touch sensor that the user has touched the door handle, the door lock device unlocks the vehicle doors.

After the exterior verification is accomplished and the vehicle door is unlocked, when the verification ECU 71 determines that the driver has opened the door end entered the vehicle 1, the verification ECU 71 transmits the wake signal Swk from the interior LF transmitter 73 and forms an interior communication area throughout the entire vehicle interior. When the electronic key 80 enters the interior communication area, the electronic key 80 performs ID verification (interior verification) in the same manner as the exterior verification. When the interior verification is accomplished, the verification ECU 71 permits activation of a hybrid system 3.

Charging System

As shown in FIG. 1, the vehicle 1 includes the hybrid system 3, which uses an engine and a motor that function as drive sources for drive wheels 2, and a battery 4, which powers the motor. The hybrid system 3 operates in a first mode, in which the drive wheels 2 are driven only by the engine, a second mode, in which the drive wheels 2 are driven by the motor that uses the engine to generate electric power, a third mode, in which the drive wheels 2 are driven by the engine and the motor, and the fourth mode, in which the drive wheels 2 are driven only by the motor.

The hybrid system 3 is connected to the battery 4. The electric power generated by the engine charges the battery 4. The battery 4 can also be charged by power from an external power supply 91, which is located outside the vehicle 1.

The battery 4 can be charged by a plug-in type charging system 90. The charging system 90 includes a power supplying plug 10 connected by a connection cable 12 to the external power supply 91, which is located in a house or a charging station. The power supplying plug 10 can be connected to the vehicle 1. The external power supply 91 supplies the vehicle 1 with AC power through the power supplying plug 10. The connection cable 12 includes a charging switch 92, which is operated to start charging. When the power supplying plug 10 is connected to the vehicle 1, the charging switch 92 is switched on or off thereby sending a corresponding signal via the power supplying plug 10 to the vehicle 1.

Figure 2:
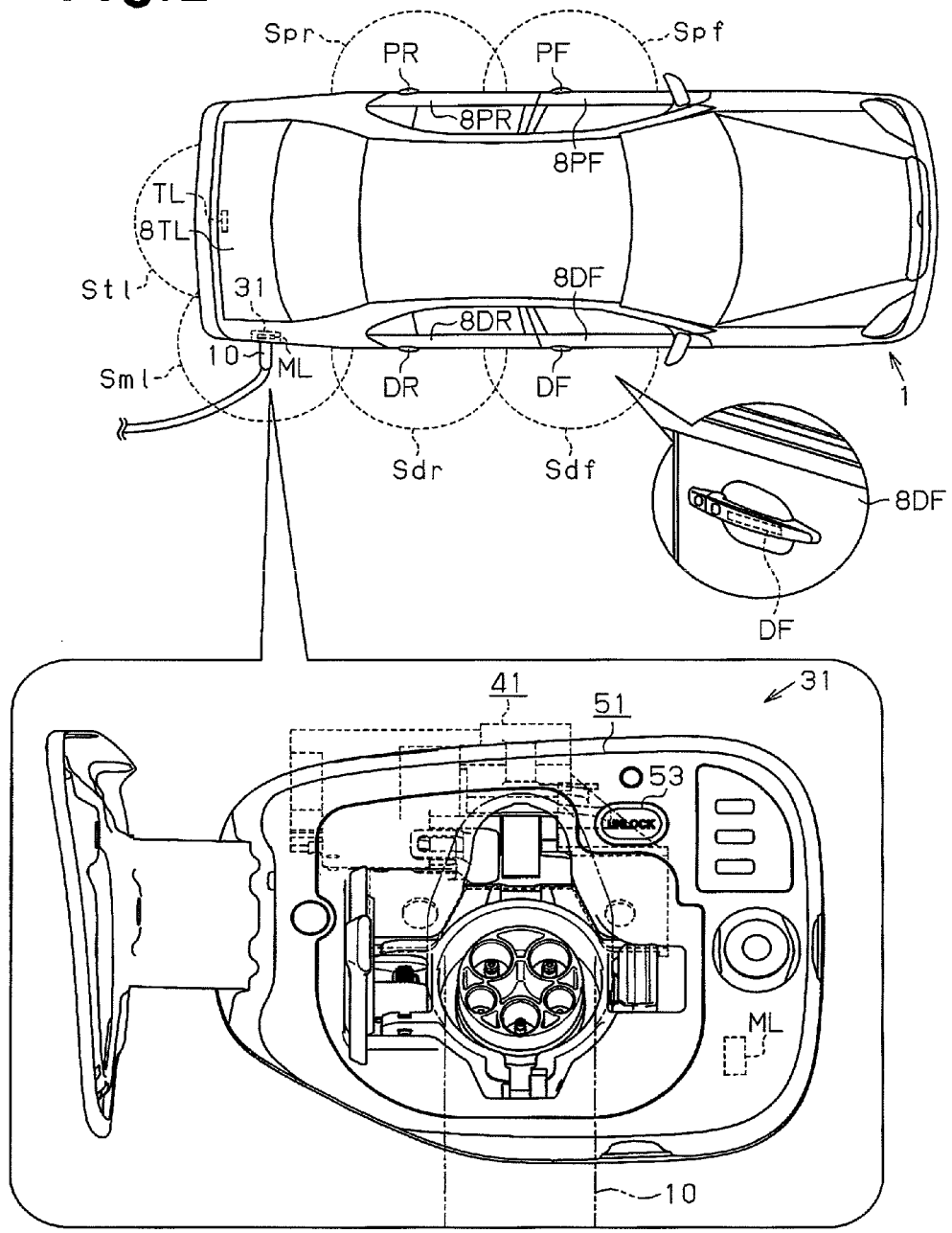
FIG. 2 is a plan view showing a vehicle of the embodiment of FIG. 1.

The vehicle 1 includes the inlet 31 connected to the power supplying plug 10. The inlet 31 is a connector component into which the power supplying plug 10 is fitted. As shown in FIG. 2, in the present example, the inlet 31 is arranged in the rear right surface of the vehicle 1. Further, the vehicle 1 includes a fender lid that protects the inlet 31 from the ambient environment.

The power supplying plug 10 is fitted to the inlet 31. This electrically connects the inlet 31 and the power supplying plug 10. The AC power supplied to the inlet 31 is converted to DC power by a converter 6. The DC power is supplied to the battery 4.

The vehicle 1 includes a charge ECU 75 that controls charging. The charge ECU 75 can communicate with the verification ECU 71 via an in-vehicle local area network (LAN). The charge ECU 75 communicates with the verification ECU 71 to check whether ID verification has been accomplished. Further, the charge ECU 75 can recognize whether the power supplying plug 10 has been fitted to the inlet 31 from the connection state of signal lines or the like.

The inlet 31 includes a lock mechanism 41 and a module 51. The lock mechanism 41 restricts removal of the power supplying plug 10 from the inlet 31. The module 51 includes electrical components such as a charge indicator that indicates the state of charge. In the present example, the lock mechanism 41 is arranged in the vehicle 1 above the inlet 31. The module 51 is arranged outward from the inlet 31. Referring to FIG. 1, the lock mechanism 41 and the module 51 are electrically connected to the charge ECU 75.

The lock mechanism 41 includes a fitting detector 43 that detects whether the power supplying plug 10 has been fitted to the inlet 31 in a preferred manner. The fitting detector 43 is electrically connected to the charge ECU 75. The charge ECU 75 uses the fitting detector 43 to determine the connection of the power supplying plug 10 and the inlet 31. When the charge ECU 75 determines that the power supplying plug 10 has been connected to the inlet 31, the charge ECU 75 restricts unauthorized removal of the power supplying plug 10 from the inlet 31 (lock state).

In a state in which the power supplying plug 10 is connected to the inlet 31, when the charge ECU 75 receives a signal indicating that the charging switch 92 has been switched on via the power supplying plug 10 and the inlet 31, the charge ECU 75 controls the converter 6 to start supplying power to the battery 4.

The module 51 includes an unlock switch 53. When the unlock switch 53 is operated, a corresponding signal is output from the charge ECU 75. When the charge ECU 75 recognizes operation of the unlock switch 53, the charge ECU 75 performs exterior ID verification with the verification ECU 71 and the vehicle exterior transmitter 72. Here, the verification ECU 71 stops operation of each door antenna and operates only the antenna of the inlet 31. The verification ECU 71 includes a timer 71b. The timer 71b is set to measure two seconds. When the verification ECU 71 receives a signal indicating operation of the unlock switch 53 from the charge ECU 75, the verification ECU 71 activates the timer 71b. During the period in which the timer 71b is activated, the verification ECU 71 transmits the wake signal Swk to a specific area from the exterior LF transmitter 72. When the charge ECU 75 recognizes that exterior ID verification triggered by the operation of the unlock switch 53 has been accomplished, the charge ECU 75 permits removal of the power supplying plug 10 from the inlet 31 with the lock mechanism 41 (unlock state). Here, the charge ECU 75 controls the converter 6 and stops charging the battery 4 from the power supplying plug 10. The charge ECU 75 includes a timer 75b. The timer 75b is set to measure thirty seconds. When the lock mechanism 41 shifts to the unlock state, the timer 75b is activated. Unless the power supplying plug 10 is removed from the inlet 31 during activation of the timer 75b, the charge ECU 75 shifts the lock mechanism 41 again to the lock state.

Communication areas formed around the vehicle 1 will now be described.

Referring to FIG. 2, the vehicle 1 includes five doors, namely, a driver side front door 8DF, a driver side rear door 8DR, a passenger side front door 8PF, a passenger side rear door 8PR, and a tail door 8TL. The tail door 8TL is a trunk lid. Each of the five doors 8DF, 8DR, 8PF, 8PR, and 8TL includes an antenna. Among the five antennas, four antennas DF, DR, PF, and PR are arranged in the door bandies of the four doors 8DF, 8DR, 8PF, and 8PR, respectively. An antenna TL is arranged in the door 8TL. Normally, each antenna is provided with a signal exterior LF transmitter. However, to ease illustration, only one exterior LF transmitter is shown in the drawings.

As shown in FIG. 2, five exterior communication areas Sdf, Sdr, Spf, Spr, and Stl are set for the five antennas DF, DR, PF, PR, and TL. The five exterior communication areas Sdf, Sdr, Spf, Spr, and Stl are semispherical and formed about the corresponding antennas DF, DR, PF, PR, and TL. The exterior communication areas Sdf, Sdr, Spf, Spr, and Stl each have a radius set to approximately one meter. A touch sensor (not shown) is also arranged on the trunk lid to detect the user touching the trunk lid and send a corresponding signal to the verification ECU 71.

The inlet 31 is arranged rearward from the door 8DR. An antenna ML is arranged in the module 51 of the inlet 31. In the same manner as the five antennas DF, DR, PF, PR, and TL, an exterior communication area Sm1 is set for the antenna ML. The exterior communication area Sm1 is semispherical and formed about the antenna ML. The communication area Sm1 has a radius set to approximately one meter. As shown in FIG. 2, the external communication area Sm1 is partially overlapped with the exterior communication areas Sdr and Stl.

The exterior ID verification will now be described. When exterior ID verification is performed, the vehicle 1 is in a parked state and the power supplying plug 10 is connected to the inlet 31.

Figure 3:
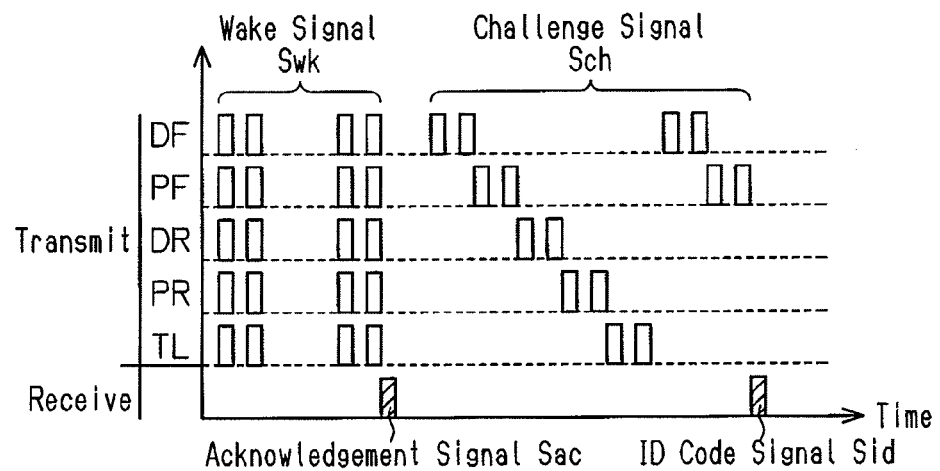
FIG. 3 is a time chart of wireless signals transmitted and received by the vehicle when locking and unlocking doors.

Referring to FIG. 3, the verification ECU 71 intermittently transmits the LF band wake signal Swk from the five antennas DF, DR, PF, PR, and TL toward the corresponding exterior communication areas Sdf, Sdr, Spf, Spr, and Stl. The five antennas DF, DR, PF, PR, and TL simultaneously transmit the wake signal Swk. When the electronic key 80 enters any one of the five exterior communication areas Sdf, Sdr, Spf, Spr, and Stl and receives the wake signal Swk, the electronic key 80 transmits the acknowledgement signal Sac.

When the verification ECU 71 receives the acknowledgement signal Sac, the verification ECU 71 recognizes that the electronic key 80 has entered one of the five exterior communication areas Sdf, Spf, Sdr, Spr, and Stl. Then, the verification ECU 71 sequentially activates the five antennas DF, PF, DR, PR, and TL in the order of the antenna DF, the antenna PF, the antenna DR, the antenna PR, and the antenna TL to sequentially transmit the challenge signal Sch to the exterior communication areas Sdf, Spf, Sdr, Spr, and Stl. This allows for recognition of which one of the five exterior communication areas Sdf, Spf, Sdr, Spr, and Stl the electronic key 80 is located in. For example, when the electronic key 80 is located in the exterior communication area Spf, as shown in FIG. 3, the electronic key 80 receives the challenge signal Sch transmitted from the antenna PF and transmits the ID code signal Sid. From the timing at which the ID code signal Sid is received, the verification ECU 71 determines which one of the exterior communication areas Sdf, Spf, Sdr, Spr, and Stl the electronic key 80 is located in (here, the exterior communication area Spf). Here, the verification ECU 71 determines whether or not the ID code in the ID code signal Sid corresponds to its ID code. This allows for the verification ECU 71 to determine whether or not exterior communication has been accomplished.

When exterior verification is accomplished and touching by the user is detected by the touch sensor of the door handle corresponding to the one of the exterior communication areas Sdf, Spf, Sdr, Spr, and Stl in which the electronic key 80 is located, the verification ECU 71 unlocks the vehicle doors with the door lock device (not shown).

Figure 4:
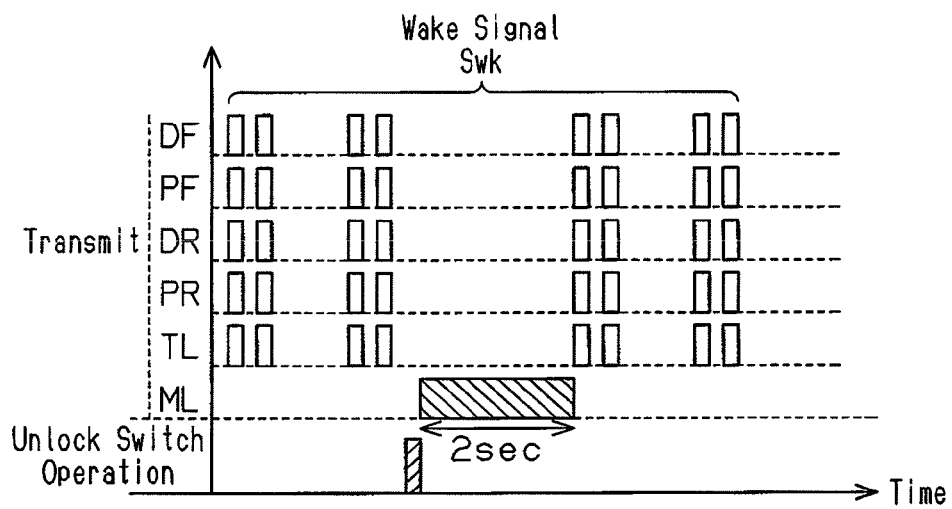
FIG. 4 is a time chart of a wireless signal transmitted from the vehicle when removing the power supplying plug.

When the unlock switch 53 in the module 51 is operated during intermittent transmission of the wake signal Swk, as shown in FIG. 4, the verification ECU 71 stops the intermittent transmission of the wake signal Swk from the antennas DF, DR, PF, PR, and TL and transmits the wake signal Swk from only the antenna ML. The transmission of the wake signal Swk from the antenna ML is set to two seconds, which is the activation time of the timer 71b. When the electronic key 80 is located in the exterior communication area Sm1, wireless communication is performed between the verification ECU 71 and the electronic key 80 in the same manner as the exterior communication.

When exterior verification is accomplished in response to the unlock switch 53, the charge ECU 75 switches the lock mechanism 41 to the unlock state and activates the timer 75b. Thus, when the power supplying plug 10 is connected to the inlet 31, the power supplying plug 10 can be removed from the inlet 31. When the power supplying plug 10 is not removed from the inlet 31 during activation of the timer 75b, the charge ECU 75 switches the lock mechanism 41 to the lock state again.

The operation of the smart system will now be described.

The verification ECU 71 activates each of the five antennas DF, DR, PF, PR, and TL to intermittently transmit the wake signal Swk. Here, the antenna AL is deactivated. When the unlock switch 53 is operated, the verification ECU 71 temporarily stops the transmission of the wake signal Swk from each of the five antennas DF, DR, PF, PR, and TL and transmits the wake signal Swk from only the antenna ML. In this manner, the timing at which the antenna ML transmits the wake signal Swk and the challenge signal Sch to the exterior communication area Sm1 differs from the timing at which each of the five antennas DF, DR, PF, PR, and TL transmit the LF band wake signal Swk and the challenge signal Sch toward the corresponding exterior communication areas Sdf, Spf, Sdr, Spr, and Stl. Accordingly, the exterior communication area Sm1 of the present example is partially overlapped with the exterior communication areas Sdr and Stl but an LF band wireless signal is transmitted from only one of the antennas. That is, LF band wireless signals are not superimposed over each other, and signal interference does not occur. Thus, signals are transferred between the vehicle 1 and the electronic key 80 in a preferred manner where exterior communication areas are overlapped.

The present embodiment has the advantages described below.

(1) When it is determined that the user intends to remove the power supplying plug 10 from the inlet 31 by operating the unlock switch 53 as the user operates the unlock switch 53, an LF band wireless signal is transmitted from the antennal ML but not from the five antennas DF, DR, PF, PR, and TL. Accordingly, wireless signals are transferred via the antenna ML in a preferred manner between the electronic key 80 and the vehicle 1 (verification ECU 71). This ensures the reliability of the wireless communication related to removal of the power supplying plug 10 and ensures reliability of the operation of the lock mechanism 41.

(2) The transmission of a wireless signal (wake signal Swk) from the antenna ML is performed when the unlock switch 53 is operated. In other words, a wireless signal is not transmitted from the antenna ML unless the unlock switch 53 is operated, and the wake signal Swk is intermittently transmitted from each of the five antennas DF, DR, PF, PR, and TL. Thus, wireless signals are transferred in a preferred manner between the electronic key 80 and the vehicle 1 when the vehicle doors are locked and unlocked. This ensures the reliability of the wireless communication related to the locking and unlocking of the vehicle doors.

The charge ECU 75 includes the timer 75b that is activated when the lock mechanism 41 shifts to an unlock state. When the power supplying plug 10 is not removed from the inlet 31 during operation of the timer 75b, the charge ECU 75 shifts the lock mechanism 41 again to the lock state. Thus, after shifting the lock mechanism 41 to the unlock state, if the user leaves the vehicle 1 for one reason or another without removing the power supplying plug 10 from the inlet 31, the lock mechanism 41 automatically shifts to the lock state again. This prevents unauthorized removal of the power supplying plug 10 when the user leaves the vehicle.

It should be apparent to those skilled in the art that the present invention may be embodied in many other specific forms without departing from the spirit or scope of the invention. Particularly, it should be understood that the present invention may be embodied in the following forms.

In the above embodiment, the unlock switch 53 may be omitted. In such a case, the wake signal Swk is transmitted from the antenna ML at a timing differing from the five antennas DF, DR, PF, PR, and TL. This also suppresses interference of the wireless signal transmitted from the antenna ML with the wireless signal transmitted from each of the antennas DF, DR, PF, PR, and TL.

In the above embodiment, the timer 75b may be omitted. Such a structure would also obtain advantages (1) and (2) of the above embodiment.

In the above embodiment, the antenna ML is arranged in the module 51. However, the location of the antenna ML is not limited as long as the antenna ML can transmit the wireless signal in the vicinity of the inlet 31. For example, the antenna ML may be arranged in an inner wall or the like of the vehicle 1 near the lock mechanism 41 or the inlet 31. Such a structure would also obtain the same advantages as the above embodiment.

In the above embodiment, the activation time of the timer 75b is set to thirty seconds. However, the activation time may be changed to any time. It is desirable that the time be set to several tens of seconds so that unauthorized removal of the power supplying plug 10 by a person other than the user can be prevented.

In the above embodiment, the activation time of the timer 71b is set to thirty seconds. However, the activation time may be changed to any time. It is desirable that the time be set to several seconds to ensure convenience when the user locks and unlocks the vehicle doors.

In the above embodiment, the charge ECU 75 controls the charging of the battery 4 from the external power supply. However, this may be controlled by the verification ECU 71. In this case, the charge ECU 75 is unnecessary.

In the above embodiment, the inlet 31 is arranged in the rear right surface of the vehicle 1. However, the location of the inlet 31 is not limited in such a manner. For example, the inlet 31 may be arranged in the rear left surface, the left or right front surface, or the front surface of the vehicle.

In the above embodiment, the frequency used by the electronic key system 70 is not necessarily limited to the LF or UHF band. Further, the frequency of the radio waves from the vehicle 1 to the electronic key 80 does not have to be the same as the frequency of the radio waves from the electronic key 80 to the vehicle 1.

In the above embodiment, the lock device is applied to the inlet 31 of the plug-in hybrid vehicle 1 but may be applied to an inlet of an electric vehicle or the like.

The present examples and embodiments are to be considered as illustrative and not restrictive, and the invention is not to be limited to the details given herein, but may be modified within the scope and equivalence of the appended claims.

The invention claimed is:

1. A lock device for a power supplying plug fitted to and removed from an inlet arranged in a vehicle, wherein the vehicle includes a verification function, which transmits and receives a wireless signal to and from an electronic key and unlocks or permits unlocking of a door, and a plurality of antennas used to transmit wireless signals requesting the electronic key for responses, the lock device comprising:
   a control unit that restricts an unauthorized removal of the power supplying plug from the inlet and permits an authorized removal of the power supplying plug from the inlet using the verification function;
   wherein the controller:
      transmits a first wireless signal that requests the electronic key for a first response related to the permission of the authorized removal of the power supplying plug from a first one of the plurality of antennas,
      transmits a second wireless signal that requests the electronic key for a second response related to the unlocking or permission of unlocking of the door from a second one of the plurality of antennas,
      stops transmitting the first wireless signal related to the permission of the authorized removal of the power supplying plug from the first one of the plurality of antennas when the second wireless signal related to the unlocking of the door is transmitted from the second one of the plurality of antennas in a state in which the vehicle is parked, and
      stops transmitting the second wireless signal related to the unlocking or permission of unlocking of the door when the first wireless signal related to the permission of the authorized removal of the power supplying plug is transmitted.

2. The lock device according to claim 1, wherein the vehicle further includes a switch connected to the control unit and operated to remove the power supplying plug from the inlet, and when the control unit receives a signal indicating operation of the switch, the control unit stops transmitting the second wireless signal related to the unlocking or permission of unlocking of the door and transmits the first wireless signal related to the permission of the authorized removal of the power supplying plug.

3. The lock device according to claim 1, wherein the control unit further includes a timer activated for a fixed period that is set based on time required for a removal of the power supplying plug when the removal of the power supplying plug from the net is permitted, and when the power supplying plug is not removed from the net within the fixed time period of the timer, the control unit restricts the removal of the power supplying plug from the inlet.

* * * * *